United States Patent
Schneider et al.

(10) Patent No.: US 9,033,107 B2
(45) Date of Patent: May 19, 2015

(54) OIL PUMP ARRANGEMENT IN A TRANSMISSION

(75) Inventors: Thomas Schneider, Tettnang (DE); Uwe Firzlaff, Uhldingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 690 days.

(21) Appl. No.: 13/289,155

(22) Filed: Nov. 4, 2011

(65) Prior Publication Data
US 2012/0128521 A1    May 24, 2012

(30) Foreign Application Priority Data

Nov. 24, 2010   (DE) .......................... 10 2010 061 896

(51) Int. Cl.
*F16H 57/04*    (2010.01)
*F01C 1/10*    (2006.01)
*F04C 2/344*    (2006.01)

(52) U.S. Cl.
CPC .......... *F16H 57/0441* (2013.01); *F04C 2/3445* (2013.01); *F04C 2210/206* (2013.01)

(58) Field of Classification Search
CPC ..... F04C 2/3445; F04C 2/206; F16H 57/0441
USPC ..................... 184/6.12; 74/467; 418/168, 150
See application file for complete search history.

(56) References Cited

U.S. PATENT DOCUMENTS

| | | | | |
|---|---|---|---|---|
| 4,103,753 A | * | 8/1978 | Holdeman | 180/247 |
| 4,468,981 A | | 9/1984 | Ries | |
| 4,489,626 A | | 12/1984 | Lemon | |
| 4,538,977 A | * | 9/1985 | Ruhl et al. | 418/150 |
| 4,713,980 A | | 12/1987 | Ida et al. | |
| 5,116,145 A | | 5/1992 | Jan de Vries | |
| 6,588,559 B2 | * | 7/2003 | Blair | 192/20 |
| 7,958,969 B2 | * | 6/2011 | Inoue et al. | 184/6.12 |
| 2010/0014994 A1 | | 1/2010 | Fischer et al. | |
| 2012/0247250 A1 | * | 10/2012 | Karafillis et al. | 74/467 |

FOREIGN PATENT DOCUMENTS

| | | |
|---|---|---|
| AT | 308 563 B | 7/1973 |
| AT | 009 290 U1 | 7/2007 |
| DE | 195 45 437 A1 | 6/1997 |
| DE | 10 2006 043 047 A1 | 3/2008 |
| DE | 10 2008 005 239 A1 | 7/2009 |
| EP | 0 349 498 A1 | 6/1989 |
| EP | 0 778 418 A1 | 6/1997 |
| FR | 1 409 696 A | 8/1965 |
| JP | 2-248756 A | 10/1990 |

* cited by examiner

*Primary Examiner* — William E Dondero
*Assistant Examiner* — Robert T Reese
(74) *Attorney, Agent, or Firm* — Davis & Bujold, P.L.L.C.; Michael J. Bujold

(57) ABSTRACT

An arrangement of an oil pump (8) and its drive in a transmission (1) that has a transmission housing (2) and at least one transmission shaft (3). The oil pump (8) is arranged coaxially with the at least one transmission shaft (3). The oil pump (8) is arranged on and can be driven by the at least one transmission shaft (3).

20 Claims, 2 Drawing Sheets

OIL PUMP ARRANGEMENT IN A TRANSMISSION

This application claims priority from German Application Serial No. 10 2010 061 896.9 filed Nov. 24, 2010.

FIELD OF THE INVENTION

The invention concerns an oil pump arrangement and its drive in a transmission that comprises a transmission housing and at least one transmission shaft.

BACKGROUND OF THE INVENTION

From DE 195 45 437 A1 by the present applicant an oil pump designed as a radial piston pump is known, which is arranged on a guide-wheel spindle of an automatic transmission fixed on the housing and is driven by the pump gear of a converter. The pump is positioned between the converter and the transmission part of the automatic transmission and is driven via the pump gear at the speed of the engine. The radial piston pump comprises an eccentric which is driven by drive fingers fixed on the pump gear. Inside the guide-wheel spindle fixed on the housing is arranged a driveshaft (not shown) of the transmission, which is driven by the turbine wheel of the converter. Thus, the radial piston pump is arranged coaxially with a transmission shaft but is not attached to it. Particularly because of the design as a radial piston pump, the structural depth in the radial direction is large. This pump drive is called a converter neck pump, and by virtue of the converter neck the drive can also be used for pumps with other designs, such as internal-gear-type pumps. Since the eccentric is coupled to the engine, the pump operates so long as the engine is running, i.e. it does not deliver anything when the engine is stopped but the vehicle is still moving. This coaxial arrangement is also called the in-line configuration.

Also known are so-termed off-axis configurations as described in DE 10 2006 043 047 A1 by the present applicant and in DE 10 2008 005 239 A1. An internal gear pump designed as a half-moon pump is fixed on a transmission housing wall of a dual-clutch transmission and arranged next to the dual clutch. The oil pump is driven by the clutch housing via a gear stage on a pump shaft. Thus, the axis of the pump shaft or of the pump gear (of the internal rotor) is positioned parallel and offset relative to the axis of the dual clutch and the two driveshafts. This off-axis design takes up a relatively large structural space in both the radial and axial directions, which is not always available in every transmission. The oil pump is always driven at engine speed via the clutch hub, a hub bell and a hub sleeve. When the engine is at rest and the vehicle is rolling, the pump delivers no oil. FIG. 1 of DE 10 2008 005 239 A1 shows the whole of the dual-clutch transmission with several transmission shafts: a hollow shaft can be driven by a first clutch and a coaxially arranged solid shaft can be driven by a second clutch; thus, the hollow and solid shafts are driveshafts. Moreover, the dual-clutch transmission comprises a countershaft and a pinion shaft, which drives an output shaft. The oil pump is arranged outside the transmission, i.e. inside a fixed housing of the dual clutch.

SUMMARY OF THE INVENTION

In the context of an arrangement of the type mentioned at the start, the purpose of the present invention is to accommodate the oil pump and its drive in the transmission in such manner that it takes up as little space as possible, especially in the radial direction.

The invention provides that the oil pump is arranged— directly or indirectly—on a transmission shaft and is driven by the transmission shaft. In a direct arrangement the pump is directly on the transmission shaft, whereas in an indirect arrangement it is arranged on a bush or similar sleeve-shaped component which is pushed onto the transmission shaft. The advantage of this arrangement is that a pump shaft for driving the pump and additional drive elements such as a gearwheel stage are not needed. This makes for a considerable gain of structural space, especially in the radial direction.

In an advantageous design the pump has a drive element, for example a pump wheel or an eccentric, which is connected to the transmission shaft by at least one carrier element. Preferably, the carrier elements are in the form of roller bodies, in particular balls. By virtue of the roller bodies on the one hand a positive rotary connection is formed between the transmission shaft and the drive element of the pump, and on the other hand the drive element is centered on the transmission shaft.

In another preferred embodiment the transmission shaft and the drive element each have longitudinal grooves, i.e. grooves running in the axial direction of the transmission shaft, whose cross-section corresponds to the shape of the roller bodies. The longitudinal grooves in the transmission shaft and the drive element of the pump partially enclose the balls and so form the positive rotary connection. At the same time this has the advantage that the drive element of the pump can be displaced axially relative to the transmission shaft. In this way axial movements of the transmission shaft that occur during the operation of the transmission can be compensated, i.e. the pump is protected against inadmissible loads in the axial direction.

In a further preferred embodiment the transmission shaft has a bush, i.e. a hollow element, which is pushed onto the transmission shaft and connected to it in a rotationally fixed manner. In this case the longitudinal or axial grooves are located in the outer surface of the bush. Such a bush may be necessary for design reasons. Arrangement of the pump on a bush, i.e. an indirect arrangement on the transmission shaft, is also advantageous in that the axial grooves can be produced more easily. Another advantage is that the intermediate sleeve or a drive output flange integrated therewith can be used for fixing a bearing on the transmission shaft.

In another advantageous embodiment the balls are held in a cage ring supported on the transmission shaft or bush, which at the same time centers the drive element. Moreover, by virtue of the cage ring the balls are held in position and better assembly is achieved.

In a particularly preferred embodiment the pump is designed as a roller cell pump. This gives the advantage of a particularly compact structure in the radial direction, since the rollers arranged between the pump wheel and the pump housing have only a relatively small diameter, so the overall diameter of the pump housing is also relatively small. As alternatives, however, other oil pump designs such as internal-gear or wing-cell pumps are possible—depending on how much radial space is available.

In a further preferred embodiment the pump has a pump housing which is accommodated in the transmission housing and fixed axially. This eliminates the need for additional fixing elements for the pump housing.

According to another preferred embodiment the pump housing is positioned next to a shaft bearing and is supported by a cup spring, the spring being clamped between the outer ring of the bearing and the transmission housing. This has the advantage that axial forces occurring in the transmission shaft are not transmitted to the pump housing, but directly to the transmission housing. Thus, the pump housing is decoupled from axial forces.

In a further preferred embodiment, the transmission shaft can be a driveshaft, countershaft, or output shaft. When the pump is arranged on a countershaft or output shaft, this has the advantage that when the engine is switched off but the vehicle is still moving, the pump is still being driven and so continues delivering oil. This can be advantageous when a vehicle is being towed. The pump arrangement according to the invention can also be advantageous as an additional pump for supplying a special oil circuit.

The transmission can be a manually shifted transmission, a dual-clutch transmission or an automatic transmission with a hydrodynamic converter. The advantages mentioned above are obtained in each case.

BRIEF DESCRIPTION OF THE DRAWINGS

An example embodiment of the invention is illustrated in the drawing and will be described in more detail below, so that further features and/or advantages can emerge from the description and/or the drawings, which show.

DETAILED DESCRIPTION OF THE DRAWINGS

Figure 1:
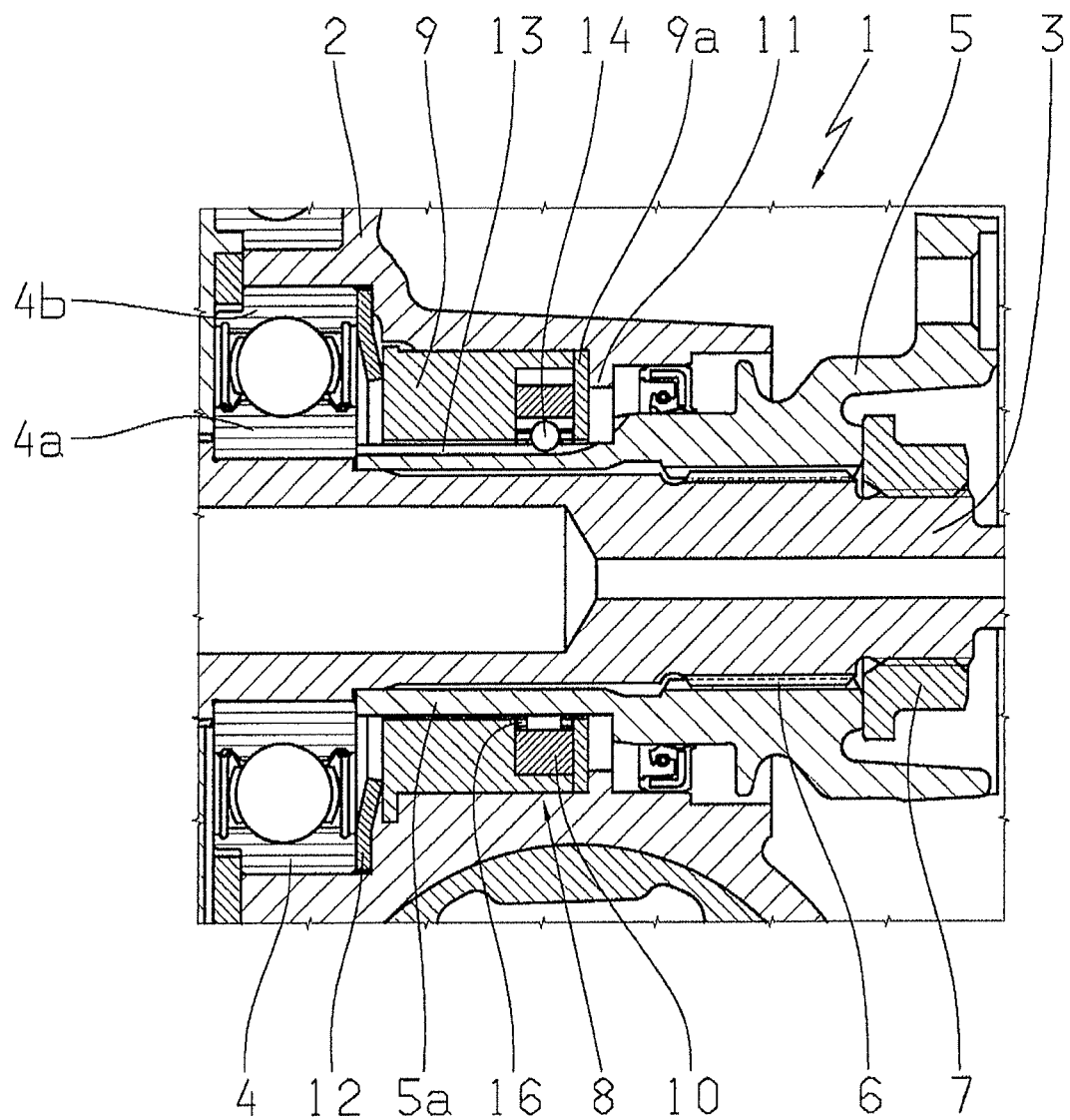
FIG. 1: An axial section through the pump arrangement according to the invention on a transmission shaft.

FIG. 1 shows a section of a transmission 1 preferably designed as a dual-clutch transmission corresponding to that of DE 10 2008 005 239 A1 mentioned earlier. The transmission 1 has a transmission housing 2 in which a transmission shaft 3 is supported by a roller bearing 4. The transmission shaft 3 is preferably a countershaft as represented in FIG. 1 of DE 10 2008 005 239 A1. Thus, the countershaft 3 is connected to the output shaft of the vehicle and therefore also rotates when the vehicle's engine is stopped but the vehicle is moving. On the output or countershaft 3, which projects out of the transmission housing 2, is fixed an output flange 5 which is connected in a rotationally fixed manner to the countershaft 3 by splines 6. The output flange 5 has a sleeve-shaped part 5a, also called the sleeve 5a, which is supported on the inner ring 4a of the roller bearing 4. The output flange 5 is fixed axially on the countershaft 3 by means of a locking nut 7. On the sleeve 5a is arranged an oil pump 8 comprising a pump housing 9 and a pump wheel 10. The pump wheel 10 is also referred to as the drive element 10 of the oil pump 8. The pump housing 9, which is closed at the end by a covering disk 9a, is supported on one side against an axial abutment in the form of a shoulder 11 of the transmission housing 2 and on the other side against a cup spring 12 which, for its part, is clamped between the outer ring 4b of the roller bearing 4 and the transmission housing 2. By virtue of the cup spring 12 the pump housing 9 is decoupled from axial forces of the countershaft 3, since any axial forces are transmitted via the inner ring 4a and the outer ring 4b directly to the transmission housing 2.

In the outer circumferential surface of the sleeve 5a are formed longitudinal grooves 13 that run in the axial direction of the transmission shaft 3, in which carrier elements in the form of balls 14 are arranged and held. The balls 14 are held in a cage ring 16 and fixed in the axial direction.

Figure 2:
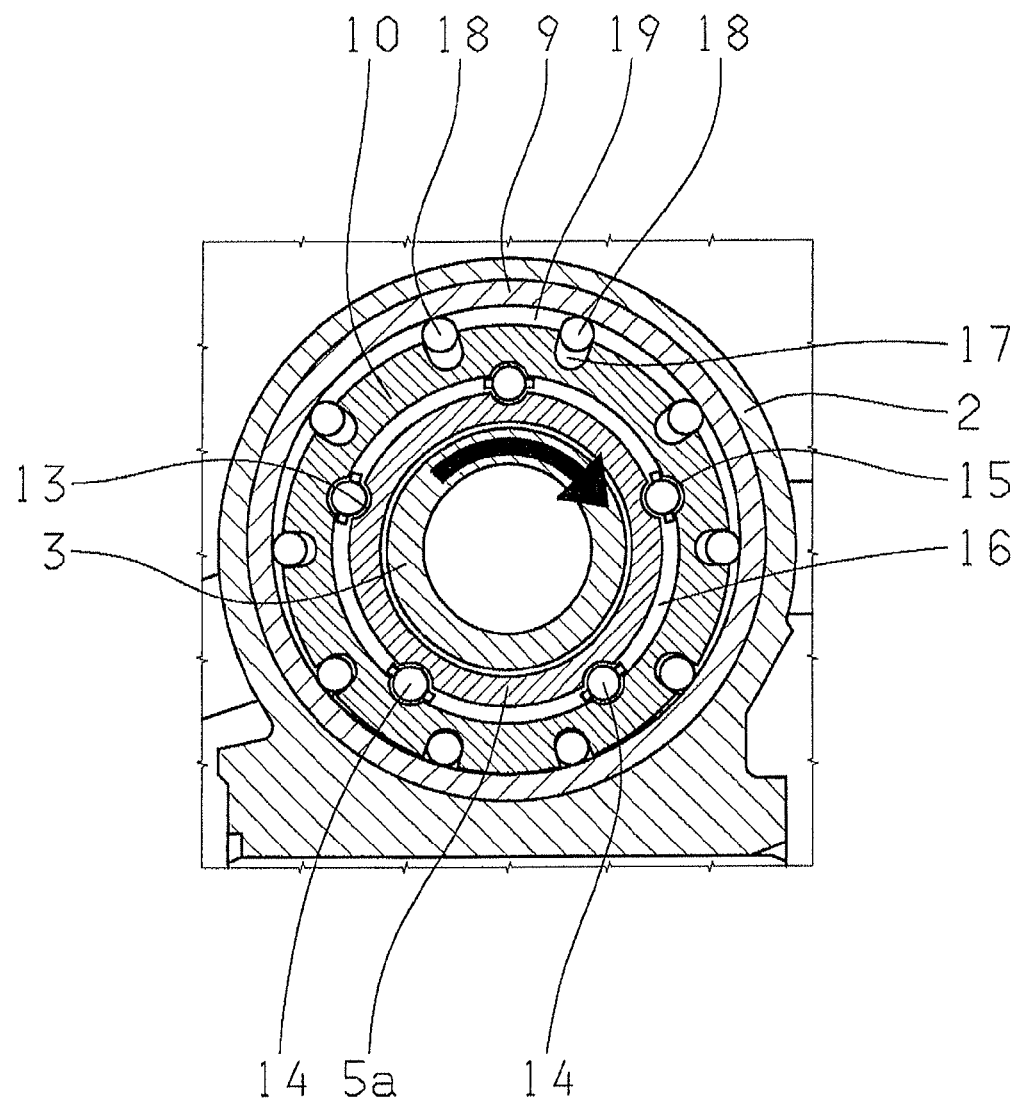
FIG. 2: A radial section through the pump arrangement of FIG. 1.

FIG. 2 shows a radial section through the pump arrangement. The pump wheel 10 has a bore with longitudinal grooves 15 in which the balls 14 are held. On the other side the balls 14, which are uniformly distributed around the circumference, are held in the longitudinal grooves 13 of the sleeve 5a so that a positive driving connection exists between the sleeve 5a and the pump wheel 10. The pump wheel 10 is centered by the balls 14 relative to the sleeve 5a and thus relative to the transmission shaft 3. At the same time the sleeve 5a and the output flange 5 can move axially (see FIG. 1). Thus, axial forces are not transmitted either to the pump wheel 10 or to the pump housing 9. The pump wheel 10 moves round in a receiving bore positioned eccentrically to the transmission shaft 3, so that a sickle-shaped gap 19 is formed. At its outer circumference the pump wheel 10 has longitudinal grooves with an approximately semicircular cross-section, in which roller elements 18 are held. When the pump wheel 10 rotates—similarly to the wings of a wing-cell pump—the roller elements 18 are pushed outward by centrifugal force and cause oil to be sucked in and displaced into the a sickle-shaped gap 19 between the pump housing 9 and the pump wheel 10. The inflow and outflow of oil is not represented and can take place radially or axially.

As already mentioned, the pump 8 is arranged on a transmission shaft in the form of a countershaft 3, which is also the output shaft. Accordingly, the pump 8 operates when the engine 13 is at rest but the vehicle is moving. However, it is also within the scope of the invention to arrange the oil pump 8 on other transmission shafts, for example a driveshaft or a pinion shaft, as represented and described in the prior art mentioned earlier. Preferably, the arrangement of the oil pump 8 and its drive according to the invention is also used as a pump auxiliary to a conventional main pump.

In the example embodiment described the oil pump 8 is arranged on a transmission shaft 3 of a dual-clutch transmission. However, it can also be arranged on a transmission shaft of an automatic transmission with a hydrodynamic converter, or some other transmission.

INDEXES

1 Transmission
2 Transmission housing
3 Transmission shaft
4 Roller bearing
4a Inner ring
4b Outer ring
5 Drive output flange
5a Sleeve
6 Splines
7 Locking nut
8 Oil pump
9 Pump housing
9a Covering disk
10 Pump wheel
11 Shoulder
12 Cup spring
13 Longitudinal groove
14 Ball
15 Longitudinal groove
16 Cage ring
17 Longitudinal groove
18 Roller body
19 Sickle-shaped gap

The invention claimed is:
1. An arrangement of an oil pump (8) and a drive element (10) of the oil pump (8) in a transmission (1) comprising:
a transmission housing (2),
at least one transmission shaft (3), the oil pump (8) being arranged coaxially with the at least one transmission shaft (3), the oil pump (8) being arranged on and drivable by the at least one transmission shaft (3), a sleeve (5a) being fixedly connected to the at least one transmission shaft (3), and the sleeve being disposed between and coupling the at least one transmission shaft (3) to the oil pump (8), wherein the oil pump is a roller cell oil pump (8).

2. The arrangement according to claim 1, wherein the drive element (10) is connected to and drivable by the at least one transmission shaft (3) by at least one carrier element (14) located between the sleeve (5a) and the drive element (10).

3. The arrangement according to claim 2, wherein the at least one carrier element is a roller element (14).

4. The arrangement according to claim 3, wherein the at least one roller element is a plurality of spaced apart balls (14).

5. The arrangement according to claim 4, wherein the plurality of balls (14) are retained in a cage ring (16) supported radially on either the at least one transmission shaft (3) or a sleeve (5a).

6. The arrangement according to claim 2, wherein the drive element (10) comprises a bore in which longitudinal grooves (15) are arranged to hold either the at least one carrier element or at least one ball (14).

7. The arrangement according to claim 2, wherein longitudinal grooves are arranged on the sleeve (5a) which at least partially enclose either the at least one carrier element or at least one ball (14).

8. The arrangement according to claim 2, wherein the drive element of the oil pump (8) is a pump wheel (10).

9. The arrangement according to claim 1, wherein longitudinal grooves (13) are arranged on the sleeve (5a).

10. The arrangement according to claim 9, wherein the sleeve (5a) is part of an output flange (5) which is fixedly connected to the at least one transmission shaft (3).

11. The arrangement according to claim 1, wherein a drive element (10) of the oil pump (8) rotates within a receiving bore, the receiving bore is positioned eccentrically with respect to the at least one transmission shaft (3) and the receiving bore is fixed with respect to the transmission housing so as to prevent rotation thereof.

12. The arrangement according to claim 1, wherein the oil pump (8) has a pump housing (9) which is one of supported in the transmission housing (2) and formed as part of the transmission housing (2).

13. The arrangement according to claim 1, wherein the at least one transmission shaft is at least one of a transmission input shaft, a transmission output shaft and a countershaft (3).

14. The arrangement according to claim 1, wherein the roller cell oil pump comprises a pump housing and a drive element, and an exterior surface of the drive element supports a plurality of roller elements (18) which are radially movable and facilitate displacement and pumping of oil during rotation of the drive element with respect to the pump housing.

15. The arrangement according to claim 1, wherein the roller cell oil pump comprises a drive element which supports a plurality of roller elements (18), the plurality of roller elements (18) are received and radially movable within a plurality of outer grooves (17) formed within an outer surface of the drive element, and rotation of the drive element causes the plurality of roller elements (18) to move to and fro, within the outer grooves (17), and displace oil into a sickle-shaped gap (19) formed between the pump housing (9) and the pump wheel (10) and pump oil.

16. The arrangement according to claim 1, wherein the drive element (10) of the oil pump (8) has an inner surface and an outer surface, the inner surface of the drive element (10) has a plurality of inner grooves (15) and the outer surface of the drive element (10) comprises a plurality of outer grooves (17);

the oil pump (8) is housed within a bore of an oil pump housing (9), and the bore is eccentric with respect to an outer surface of the drive element (10) of the oil Pump (8);

the sleeve (5a) and the transmission shaft (3) rotate in unison around a rotational axis, and the sleeve (5a) comprises an outer surface which has a plurality of outer grooves (13); and the drive element (10) is concentrically supported on the sleeve (5a) such that the plurality of inner grooves (15) of the drive element (10) communicate with the plurality of outer grooves (13) of the sleeve (5a) and such that the drive element (10) is axially slidable and rotationally fixed with respect to the sleeve (5a), and the drive element (10) so as to be rotationally driven by the sleeve (5a).

17. An arrangement of an oil pump (8) and a drive of the oil pump (8) in a transmission (1) comprising:

a transmission housing (2), and at least one transmission shaft (3), the oil pump (8) being arranged coaxially with the at least one transmission shaft (3) and drivable by the at least one transmission shaft (3), the oil pump (8) having a pump housing (9) which is one of supported in the transmission housing (2) and formed as part of the transmission housing (2), and the pump housing (9) being supported, relative to the transmission housing (2), by a cup spring (12).

18. The arrangement according to claim 17, wherein the oil pump (8) is arranged next to a bearing (4) of the transmission shaft (3), and the cup spring (12) is clamped between an outer ring (4b) of the bearing (4) and the transmission housing (2).

19. The arrangement according to claim 17, wherein a plurality of roller elements (18) are respectively received and radially movable within a plurality of outer grooves (17) formed in an oil pump wheel (10), and rotation of the oil pump wheel (10), within an eccentric bore of the pump housing (9), causes the plurality of roller elements (18) to move to and fro, within the plurality of outer grooves (17) of the oil pump wheel (10), and displace oil into a sickle-shaped gap (19) formed between the pump housing (9) and the pump wheel (10) and pump oil.

20. An arrangement of an oil pump (8) in a transmission (1), the arrangement comprising:

an oil pump wheel (10) having an inner surface and an outer surface, the inner surface of the oil pump wheel (10) comprising a plurality of inner grooves (15) and the outer surface of the oil pump wheel (10) comprising a plurality of outer grooves (17), the oil pump wheel (10) being housed within a bore of an oil pump housing (9), and the bore being eccentric with respect to the outer surface of the oil pump wheel (10);

a sleeve (5a) being supported by a transmission shaft (3) such that the sleeve (5a) and the transmission shaft (3) rotate in unison around a rotational axis, and the sleeve (5a) comprising an outer surface which has a plurality of channels (13);

the oil pump wheel (10) being concentrically supported on the sleeve (5a) by a plurality of balls (14), and the balls (14) communicating, on one side, with the plurality of inner grooves (15) of the oil pump wheel (10) and, on another side, with the plurality of channels (13) of the sleeve (5*a*) such that the oil pump wheel (10) is axially slidable and rotationally fixed with respect to the sleeve (5*a*), and the oil pump wheel (10) thereby being rotationally driven by the sleeve (5*a*); and a plurality of roller elements (18) are received and radially movable within the plurality of outer grooves (17) of the oil pump wheel (10) such that rotation of the oil pump wheel (10), within the eccentric bore of the oil pump housing (9), causes the plurality of roller elements (18) to move to and fro within the plurality of outer grooves (17) of the oil pump wheel (10) and displace oil into a sickle-shaped gap (19) between the pump housing (9) and the pump wheel (10).

\* \* \* \* \*